United States Patent [19]

Cohen

[11] Patent Number: 5,465,390
[45] Date of Patent: Nov. 7, 1995

[54] METHOD FOR LAYING OUT THE INFRASTRUCTURE OF A CELLULAR COMMUNICATIONS NETWORK

[75] Inventor: Robert Cohen, Paris, France

[73] Assignee: France Telecom, Paris, France

[21] Appl. No.: 17,102

[22] Filed: Feb. 12, 1993

[30] Foreign Application Priority Data

Feb. 14, 1992 [FR] France ................................. 92 01904

[51] Int. Cl.$^6$ .............................. H04Q 7/00; H04Q 9/00
[52] U.S. Cl. ........................... 455/33.4; 455/56.1; 379/60
[58] Field of Search .................................. 455/33.1, 33.2, 455/33.3, 33.4, 51.1, 54.1, 56.1, 62–63, 67.1, 67.6, 103; 379/58, 59, 60

[56] References Cited

U.S. PATENT DOCUMENTS

| | | | |
|---|---|---|---|
| 4,667,202 | 5/1987 | Kammerlander et al. | 342/457 |
| 5,293,640 | 3/1994 | Gunmar et al. | 455/33.1 |
| 5,293,642 | 3/1994 | Lo | 455/33.1 |

FOREIGN PATENT DOCUMENTS

| | | |
|---|---|---|
| 9103138 | 3/1991 | Japan. |
| WO-A- 9010342 | 9/1990 | WIPO. |
| WO-9010342 | 9/1990 | WIPO. |

OTHER PUBLICATIONS

Herbert Panzer, Reiner Beck: *Adaptive Resource Allocation in Metropolitan Area Cellular Mobile Radio Systems*, IEEE, May 6, 1990, pp. 638–645.

A. Gamst, E.-G. Zinn: *Cellular Radio Network Planning*, IEEE AES Magazine, Feb. 1986, pp. 8–11.

Ollie Grimlund, Ejorn Gudmundson: *Handoff Strategies in Microcellular Systems*, IEEE, pp. 505–510.

Greger Jismalm, Jan-Olof Lejdal: *Cell Planning–Products and Services*, 8039 Ericsson Review, No. 2, 1990, pp. 84–91.

Hajrudin Beca, Dorde Paunovic, Ilija Stojanovic: *A Design Concept for Reconfigurable Mobile Radio Networks with Slow Frequency–Hopping Signaling*, IEE, No. 4, May 1990, pp. 603–612.

Primary Examiner—Reinhard J. Eisenzopf
Assistant Examiner—Mary M. Lin
Attorney, Agent, or Firm—Kinney & Lange

[57] ABSTRACT

A method for the laying out of the infrastructure of a cellular communications network, notably with mobile units, the network being of the type constituted by a plurality of broadcasting transmitters, each broadcasting on its own broadcasting cell, at least certain of the cells being adjacent and having common overlapping zones, a system of management of the network assigning a single broadcasting cell to a given mobile unit at a given time, according to a given broadcasting transmitter assigning method, the method for the laying out consisting in determining the geographical location and the technical characteristics of each of the transmitters of the network in taking account of the conditions of entry/exit and of movement of the mobile units in the overlapping zones. Thus, the coverage of the network is determined dynamically, such as it is seen by the mobile units.

29 Claims, 3 Drawing Sheets

METHOD FOR LAYING OUT THE INFRASTRUCTURE OF A CELLULAR COMMUNICATIONS NETWORK

BACKGROUND OF THE INVENTION

1. Field of the Invention

The field of the invention is that of systems of cellular radio communications, notably for communications with mobile units. More specifically, the invention relates to the laying out of the infrastructure of cellular networks, i.e. particularly the determining of the geographical location of the transmitters and of their technical characteristics so as to achieve optimum compliance with a certain number of constraints (such as geographical coverage, bit rate etc.).

The method of the invention can be applied to any type of cellular network. A especially promising field of application is that of radiotelephony with mobile units, whether these are analog systems such as the "Radiotom 2000 Haute Densité" (registered mark) system or digital systems such as the European GSM (Group Special Mobile) system.

In a simplified version, the invention can also be applied to digital broadcasting systems such as the DAB (digital audio broadcasting) system.

Hereinafter, and without thereby restricting the scope of the invention, it is essentially the case of radiotelephony that will be considered. Indeed, an efficient solution to the problem of the growing number of radiotelephone subscribers is the introduction of a cellular-architecture based system of radio communications with the mobile units.

2. Description of the Prior Art

In such systems, the territory to be covered is cut up into zones or sectors known as cells.

Each cell is served by a base station (transmitter, receiver) fulfilling the dual function of ensuring radioelectric or radio coverage and of handling the communications traffic generated by the mobile units that are linked to it by radio.

Two contiguous cells use different frequencies, but the frequency assigned to a cell can be re-used further down, provided that rules of re-use proper to the system are followed, ensuring a certain degree of protection from interference. The set of connex (neighboring) cells sharing the totality of the frequencies allocated to the network is called a cell pattern.

It is in the interest of cell networks to enable the re-use of the frequencies, by translation of the cell pattern. The trade-off here is that it becomes necessary to track the mobile units. It is necessary to have the ability to localize the cell visited by a mobile unit or, more generally, the group of cells (zone of localization) to which this cell belongs, to enable a call to be transferred to this mobile unit, but it is also necessary to have the ability to maintain communications that are in progress when changing cells (i.e. to achieve intercell handover).

While, until now, the dimensions of the networks enabled a pragmatic approach to certain technical questions, the present complexity of these networks makes it indispensable to set up a tool of assistance to the engineering of cellular networks.

The planning of the mobile cellular networks consists chiefly in:

—deciding the locations for the installation of the transmitter stations in ensuring appropriate coverage from these sites;

—defining the cell pattern, and distributing the frequencies;

—dimensioning the cells in terms of traffic channels and signalling;

—defining the systems parameters such as the localization zones,

—determining the parameters of the algorithms used in the networks (for the inter-cell handover for example) taking account notably of the following optimization criteria:

—radioelectric or radio resources (Erlang/MHz/km2),

—infrastructural costs (dimensioning of traffic and signalling channels, size of cells etc.).

There already exist known procedures for the planning of cell networks, such as those proposed by the following systems: GRAND (registered mark), PHILIPS (registered mark) or CELLNET (registered mark) by BRITISH TELECOM.

These procedures are essentially oriented towards the planning of radio projects. A probabilistic model of radio wave propagation is used in a region for which a plan is to be prepared. The values of the parameters of this model are obtained by the standard method of statistical regression on the basis of field measurements. It is then possible to determine the radio coverage of the network for this model.

Certain tools also take account of the traffic aspects. However, in this case, this is done only statically: all that these tools process is the integration of distribution of traffic measured. This entails the assumption that the network is already operational, and permits only second-level modifications. If a base station is entrusted with managing a flow of traffic that is excessive for its configuration, then the engineering has to be modified locally.

Besides, in these existing tools, the procedure used for making the final adjustments to the system always entails the assumption that the coverages used are connex and/or convex and therefore do not show any interruptions or uneven features as far as the user is concerned. Now experience shows precisely that, especially in an urban environment, the coverages are accompanied by gaps and phenomena of resurgence that are detrimental to the quality of service.

It is an aim of the invention notably to overcome these drawbacks of the prior art.

In particular, an aim of the invention is to provide a method for the laying out of the infrastructure of a cellular network enabling the optimization of the transmitter sites from several points of view, notably those of:

—spectral efficiency;

—telephone traffic and signalling density of the network and, consequently, the optimizing of infrastructural costs.

Another aim of the invention is to provide a method such as this that can be used both for the complete building of a cellular network, it being then possible to compare several simulated options if necessary, and for the development of an already existing network (i.e. for increasing its capacity and/or its geographical coverage) or for the real-time or deferred follow-up of an existing network.

The invention is also aimed at providing a system such as this that can apply to any cellular system, whether the broadcasting is analog or digital and whether the broadcasting is one-directional or radiotelephonic (two-directional).

A secondary aim is to provide a method such as this that optimizes the sharing and use of the total transmission resources.

Another secondary aim of the invention is to provide a method such as this that also provides for the optimization of the automatic inter-cell handover and reselection algorithms (which shall be described in greater detail here below) implemented by the management system of the network.

SUMMARY OF THE INVENTION

These aims and others that shall appear here below are achieved according to the invention by means of a method for the laying out of the infrastructure of a cellular communications network, notably with mobile units, a network of the type constituted by a plurality of broadcasting transmitters each broadcasting on its own broadcasting cell, at least certain of the cells being adjacent (i.e. declared to be neighboring cells) and having common overlapping zones, a system of management of the network assigning a single broadcasting cell to a given mobile unit at a given time, according to a given broadcasting transmitter assigning method, wherein said method consists in determining the geographical location and the technical characteristics of each of said transmitters of the network in taking account of the conditions of entry/exit and of movement of the mobile units in the overlapping zones.

Known laying-out methods determine a static radio coverage. However, it is known that the actual format of the cells does not correspond, in reality, to the format thus computed.

Indeed, if there is an overlapping zone between two contiguous cells, a mobile unit may be assigned to either one of the cells. Generally, a mobile unit remains assigned to the cell that manages it even when it has geographically left the most efficient coverage zone of this cell. Thus, from the viewpoint of the mobile unit, the cell that it leaves is greater than the conventionally determined cell (the mobile unit "draws" the coverage) while the cell in which it enters is smaller. The invention therefore proposes a novel and original approach to the problem, wherein the coverage of the network is considered as it is seen by a mobile unit (i.e. it is considered in its dynamic aspect) and no longer as it is seen by the transmitters. It will easily be understood that this new approach is particularly efficient, for it enables the system to be closely geared to reality, notably when the road system corresponds to an overlapping zone.

In an advantageous embodiment of the invention, the method comprises the steps of:

—determining the radio coverage of at least certain of said broadcasting cells,

—determining the traffic, i.e. exchanges of information, in at least certain of said broadcasting cells, taking account of said method for the assigning of cells.

Thus, to a first standard step, there is added a complementary step that takes account of the traffic and the mobility. It is thus possible to determine the optimal characteristics of each cell with very high precision.

Advantageously, the method also comprises an additional complementary step for the determining of the localization zones, one localization zone comprising at least two cells.

The use of localization zones makes it possible notably to minimize the traffic due to operations for the updating of localization, as a function of the movements of the mobile units (only the changing of zones is taken into account, not the changing of cells).

Advantageously, said step for determining localization zones determines said localization zones so as to minimize the signalling traffic.

Advantageously, said method for the assigning of cells comprises the following two operations:

—automatic inter-cell handover for mobile units that are in the process of communicating and changing their broadcasting cell;

—reselection of a cell, for mobile units changing from an off state to a stand-by watch state or from a stand-by watch state to a communicating state, so as to enable the transmission or reception of information elements. The reselected cell is generally the cell that provides the best conditions of reception.

In a standard way, it is indeed these two algorithms that determine the needs of each cell.

Advantageously, said step for the determination of the traffic may take account, for each mobile unit, of at least certain elements of the following information elements:

—starting point of said mobile unit;

—speed of said mobile unit;

—law governing the movement of said mobile unit;

—direction of said mobile unit;

—state of the mobile unit (in communication mode, in stand-by watch mode, out of stand-by watch mode (or at rest)).

It is thus possible, in a manner very closely geared to reality, to determine the ways in which the algorithms must be used.

Preferably, said step for determining the traffic takes account of the position of the mobile unit on a traffic route or off it, and/or the importance of said traffic route.

It is indeed clear that the probability of a mobile unit's being on a major road is greater than that of its being on a secondary road, or even greater than that of its being off the road. In taking this criterion into account, the method of the invention therefore determines the importance and influence of the traffic with greater exactness.

Similarly it is advantageous for said traffic determination step to take account of an information element for the geographic characterization of the zone in which said data exchanges take place.

Indeed, the conditions of propagation differ greatly, depending on whether the place considered is in flat country, in wooded surroundings or in urban surroundings.

On the basis of these information elements, the method of the invention can advantageously implement at least one statistical model of the movement of said mobile units in said cells.

Several models can be tested in parallel, only those closest to reality being kept.

Preferably, the method includes a traffic measurement step, providing information for said traffic determination step.

This makes it possible to specify the characteristics of the statistical models and, if necessary, to select the best model.

Advantageously, the method of the invention also comprises a step to determine gaps in the coverage of said network.

For, it is known that it is not rare for one or more non-reception zones to appear in the overall coverage of the zone.

In this case, it is advantageous for the method to include a step for the modification of said method for the assigning of cells, on the basis of information provided by said step for the determining of gaps in coverage, so that said gaps in coverage are taken into account during the assigning of the cells.

In other words, according to the invention, there is interaction between the determining of the infrastructure of the network, which takes account of the handover and selection algorithms, and these algorithms which are optimized as a function of the infrastructure of the network.

It is thus possible to eliminate the zones of radio non-coverage, or the zones where the inter-cell handovers are very frequent.

Advantageously, the method also includes a step for the selection of an automatic inter-cell handover algorithm from among at least two automatic intercell handover algorithms.

Preferably, said step for the determining of the radio coverage is preceded by a step for the determining a model of propagation, taking account of the radioelectric field values measured and/or estimated by computation.

For example, said step for the determining of the radio coverage includes at least one of the following operations:

— measurements of radioelectric field;
— interpolation of the radio coverage from said measurements, to geographical zones close to said measurements;
— extrapolation of said radio coverage from said measurements;
— choice of a propagation model from among at least two available models, and an operation to determine the total radio coverage, on the basis of said measurements and/or interpolations and/or said extrapolations made and/or the propagation model chosen.

It is preferable for said measurement operation to cover at least 30% of said total coverage.

Advantageously, said step for determining a propagation model weights said measurements as a function of their representativity in terms of radio coverage.

In a preferred embodiment of the invention, said interpolation and extrapolation steps include the following steps:

— classification of the measurements into at least two groups;
— application of a distinct model of interpolation for each of said groups.

Advantageously, the method of the invention also includes a step for the modification of at least one of the characteristics of the transmitters and/or receivers.

These characteristics may notably belong to the group comprising:

— antenna pattern;
— power;
— azimuth;
— number and/or value of the transmission frequencies;
— number of service channels;
— number of communications channels.

Preferably, the method takes account of at least one of the constraints belonging to the group comprising:

— predefined location of a transmitter and/or receiver;
— relief;
— predefined form of at least one cell.

Advantageously, said method further includes a step for the assigning of a total transmission resource to each of said cells and/or the dividing up of the total transmission source assigned to each of said cells into signalling channels and traffic channels, capable for example of taking account of at least one of the constraints belonging to the group including the probability of waiting for an available channel and the probability of the blocking of said resource.

Preferably, in order to optimize the results of the method, at least one of said steps is performed at least twice.

BRIEF DESCRIPTION OF THE DRAWING

Other features and advantages of the invention will appear from the following description, given as non-restrictive embodiments, and the following drawings, in which.

DETAILED DESCRIPTION OF THE INVENTION

The example described here below relates to the planning of radiotelephony cellular networks.

It is indeed known that an efficient solution to the problem of the growing number of radiotelephone subscribers lies in the introduction of a cellular-architecture based system of radio communications with mobile units: the territory to be covered is cut up into zones or sectors called cells (about 500 for France).

While the degree of urbanization and industrialization of the roads system and its size justify the number of cells that constitute it, the shapes and dimensions (ranging from some units to some tens of kilometers) of these cells vary notably as a function of:

— the local conditions of propagation (due notably to the level of urbanization),
— the sites available (Post and Telegraph buildings) or necessary (high points) for the installation of the transmitters,
— the parasitic influence of the transmitters of neighboring zones,
— the use, by the transmitter base, of a directional antenna.

Each cell is serviced by only one base (transmitter) station. Contiguous cells use different frequencies, but the frequency assigned in a cell may be re-used, for example three zones further down.

While the exact shape of the cells is closely related to the factors cited, it would appear to be indispensable to be able to have available an interactive system for plotting coverage cells or zones in which the power received and/or the ratio C/I (carrier signal/interference signals) is greater than a given level.

In the planning of mobile cellular networks, which is very different from the planning of fixed networks, four types of information elements are therefore required, and form the core of the engineering of these networks:

— the zone of coverage (the zone in which the field received by a mobile unit is above a given threshold) of a given transmitter,
— the way in which to dimension the transmitter in terms of traffic and signalling channels,
— the way in which to define and finalize the algorithms used in the network (automatic inter-cell handover and reselection algorithms for example),
— the way in which to define the localization zones.

The invention proposes a method for the laying out of the infrastructure of the networks providing an optimized solution to these different questions, notably in taking account of the elasticity introduced by the use of the automatic inter-cell handover and reselection algorithms.

Before describing the method of the invention, the essential characteristics of cellular networks are recalled.

POINTS TO BE REMEMBERED

1. The Functions of the Networks

The functions fulfilled by a cellular network are described in the technical specifications of said network. However, it is necessary at least to consider the following functions common to the different networks.

. management of radio resources:
—radio transmission according to one of the following criteria of management of the radio resources:
— OACSU (off air call set up): the allocation of the traffic channel is done only after an indication that the called party has picked up the receiver;
—HOACSU (half OACSU): the allocation of the traffic channel is done on reception of the call request; the call is made to go ahead without waiting for the allocation of the traffic channel;
—NOACSU (no OACSU): the allocation of the traffic channel is done on reception of the call request; the continuation of the call is suspended so long as the allocation of the traffic channel is not completed.
—function of access to the network by the mobile units,
—paging of mobile units: this consists in requesting a mobile unit to access the resources of the network, the request being broadcast in all the cells of a zone, called a localization zone, in which the mobile unit is located,
—automatic inter-cell handover of the resources during a communication (the algorithm depends on the network),
—placing in a queue for the allocation of a resource, . management of the mobile units
—updating of localization: this makes it possible to determine, according to their movements, the list of the mobile units present in a zone of localization. The procedure depends on the network.

. management of the calls
—management of the calls taking account of priorities (incoming/outgoing calls, inter-cell handover upon request for communication),
—management of incoming calls (towards a mobile unit),
—management of outgoing calls (requested by a mobile unit).

2. The Resources

Radiocommunications networks have a resource at their disposal that is physically limited: this resource is a fraction of the spectrum of frequencies. The cellular concept enables these frequencies to be re-used under certain conditions, and hence enables an increase in the capacity of the network and an improvement in its performance characteristics.

The designing of radiocommunications networks with mobile units requires the possibility of fulfilling a number of functions (access to the system, tracking of the mobile units, continuity of the communications, exchange of signalling transparent to the mobile units etc.).

Each of these functions is implemented by a radio channel. The logic channels are multiplexed on a physical channel (for example, a carrier at one frequency or several frequencies in turn).

Each cell has available a set of channels to which it can assign specialized functions in signalling or in telephony.

3. Activity of the Mobile units

A mobile unit may be at rest (station off), on stand-by watch ("station identified") or active (communicating).

A mobile unit at rest cannot be identified by the network (the result of an operation for paging the mobile, which is always done by the network is negative but consumes signalling resources).

A mobile unit on stand-by watch is tracked by the network (with updating of the localization) and can be reached in the case of an incoming call (paging of the mobile unit in the localization zone responsible for it).

A mobile unit that is in a state of communication is not paged by the network.

The possible changes in states are: change from the rest or off state to the stand-by watch state; change from the stand-by watch state to the active state; change from the active state to the stand-by watch state; change from the active state to the off or rest state. The change from the rest state to the active state is done via the stand-by watch state which generates the signalling.

4. Propagation

The physical phenomena that come into play in communications with vehicles moving in an urbanized zone are such that the radio power received by the mobile unit is subjected to random disturbances (even if the transmitter antenna sends out constant power at a fixed frequency) that result from the combination of three factors:

. the small-scale effects or fast fluctuations known as Rayleigh effects: at two points that are relatively close to each other (some wavelengths) the variations of the power received are very big and completely decorrelated; they are due to the reflections and to the multiple paths of the waves, . the medium-scale effects or slow variations due to the "masks": the mean of the local field on a distance of 20 to 40 wavelengths eliminates the fast fluctuations but continues to be affected by slow variations due to the surrounding masks. These fluctuations of the field are modelized by a random variable, the log-normal law, or by a normal law if they are expressed in decibels, with a variance of 5 to 8 dB.

The large-scale effects or variations of the mean cellular field: these variations are no longer random but depend on disparate elements such as the degree of urbanization, the difference in altitude, whether the stations are fixed or mobile, etc.

5. Service Algorithms

Three algorithms are implemented to ensure the accessibility and the follow-up of the services offered by the mobile network to its subscribers.

. Random access algorithm

The procedure of access to the network by a mobile unit is of the crenellated random-access type. This algorithm is implemented when a mobile unit is asking for radio resource, or when the mobile unit wishes to respond to a paging message.

. Reselection algorithm

The choice of a reception cell in the network is done by a (re)selection algorithm. The mobile unit is thus localized in the cell where the quality of a communication if any is optimized.

. Automatic inter-cell handover algorithm

When a mobile unit enters into communication, the tracking of the communication, when cells are changed, is ensured by the implementation of an automatic inter-cell handover algorithm. (If the interferences are excessively high, the mobile unit may also have a new traffic channel allocated to it. The term used then is "automatic intra-cell handover").

The initial aim of the automatic inter-cell handover, in a cellular network approaching the ideal, is to maintain communications under the most efficient conditions of quality, despite the movement of the mobile units in the cells of the network.

The algorithms that fulfil the AIH function may be relatively complex, but the AIH decisions are taken on the basis of measurements, made by the mobile units and by the base stations, providing relatively precise descriptions of the conditions of propagation between the base station and the mobile unit, at the instant of the measurements. The parameters used in such algorithms are, for example: the level of power received, the C/I ratio, distances from the mobile unit to the base station and to the adjacent stations, the relative traffic loads of the adjacent cells.

METHOD OF THE INVENTION

The main aim of the engineering of the cellular networks for radio-communications with the mobile units according to the invention is to enable a reasoned approach to certain technical points related to the mobility of the subscribers and to the traffic of the cells. These points pertain to:
— the need to have precise knowledge of the relative importance of the various parameters characteristic of the network, as well as the impact of a modification of these parameters with the aim of achieving control and optimization in the use of the resources;
— the need to make it possible, by simulation of the behavior of the subscribers, to forecast needs and dimension the cells, and to achieve control over the elasticity induced by the use of the algorithms etc.

The planning tool of the invention therefore makes it possible notably to:
. compute (by prediction or interpolation) and to display coverages, especially those related to the mobility for AIHs at entry to and exit from the cell,
. describe the traffic flows between cells, localization zones etc.
. describe the localization zones,
. describe and simulate an AIH algorithm to measure its relevance,
. display the locations of AIH,
. dimension the network,
. simulate the development of the network in time,
. dynamically simulate the system, in managing incidents related to cells,
. display these data elements.

The essential characteristic of the invention is the taking into account of the elasticity of the cells, namely the impact of the mobility and of the algorithms on the traffic capacity or the radio coverage.

Indeed, seen from a mobile unit, the real coverage of a cell differs from its radio coverage depending on whether the mobile unit is entering therein (smaller coverage) or coming out (bigger coverage).

In other words, the invention relies on the novel approach to the problem of the laying out of the infrastructure of the cellular networks, wherein these networks are considered as seen by the mobile units (dynamic approach) and no longer according to the conventional method as they are seen by the base stations of each cell (static approach).

Figure 2:
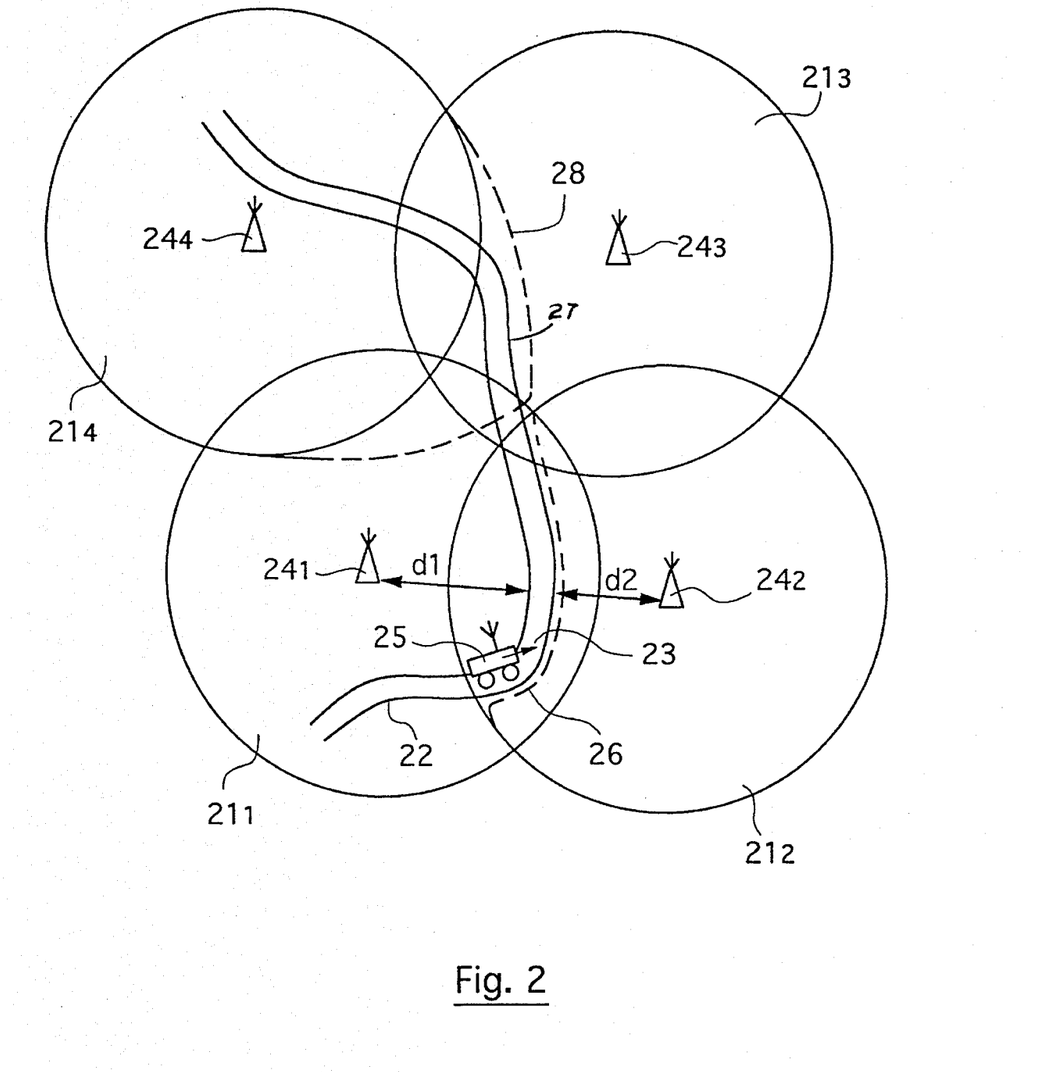
FIG. 2 schematically illustrates part of a cellular network.

FIG. 2 schematically illustrates a part of a cellular network comprising four cells $21_1$ to $21_4$ (based on their radio-electric coverage) each controlled by a respected base station $24_1$ to $24_4$. A road 22 passes through the cells as shown. A vehicle carrying mobile unit 25 is shown on portion 23 of road 22 and is simultaneously in cells $21_1$ and $21_2$.

Prior planning techniques based on radio-electric analysis would assign mobile unit 25 to the base station 24 to which it is closest. Thus, at some point in the common area of cells $21_1$ and $21_2$, control of mobile unit 25 would be passed over from base station $24_1$ to base station $24_2$ because distance $d_1$ is greater than distance $d_2$. However, in the present case, the mobile unit 25 originated from cell $24_1$. Consequently, the algorithms of the present invention, which strive to limit transfers, will maintain mobile unit 25 attached to cell $24_1$.

In the example illustrated in FIG. 2, a mobile unit on road 22 would not become attached to cell $24_2$ (unless it originated in cell $24_2$), thereby reducing resources required for cellular operation. Consequently, the true coverage of base station of $24_2$ is illustrated by dotted line 26 and the invention optimizes the resource allocation as a function of this real coverage as well as the technical characteristics of base station so as to obtain a real coverage limiting the transfer of cells.

The optimization of the technical characteristics of the base station is illustrated particularly with base station $24_4$. As shown in FIG. 2, a short portion 27 of road 22 passes through cell $24_3$. This normally will induce several transfers between cells $21_1$ to $21_3$ and $21_3$ to $21_4$. According to the present invention, however, the technical characteristics of base station $24_4$ are modified to obtain coverage defined by dotted line 28. Thus, there would be no transfer of mobile unit 25 to cell $21_3$. Hence, signaling of traffic will be reduced.

The invention also defines localization zones that group several cells. Typically, a localization zone is the entity considered for locating a mobile station for example passing a call to it. According to the invention, the definition of these zones is done so as to limit the signaling traffic, for example to limit the changes of localization zones (same analysis as for cells). In FIG. 2, a localization zone 29 preferably includes cells $21_1$ and $21_4$ to avoid changes of zones from mobile units moving along road 22.

Figure 1:
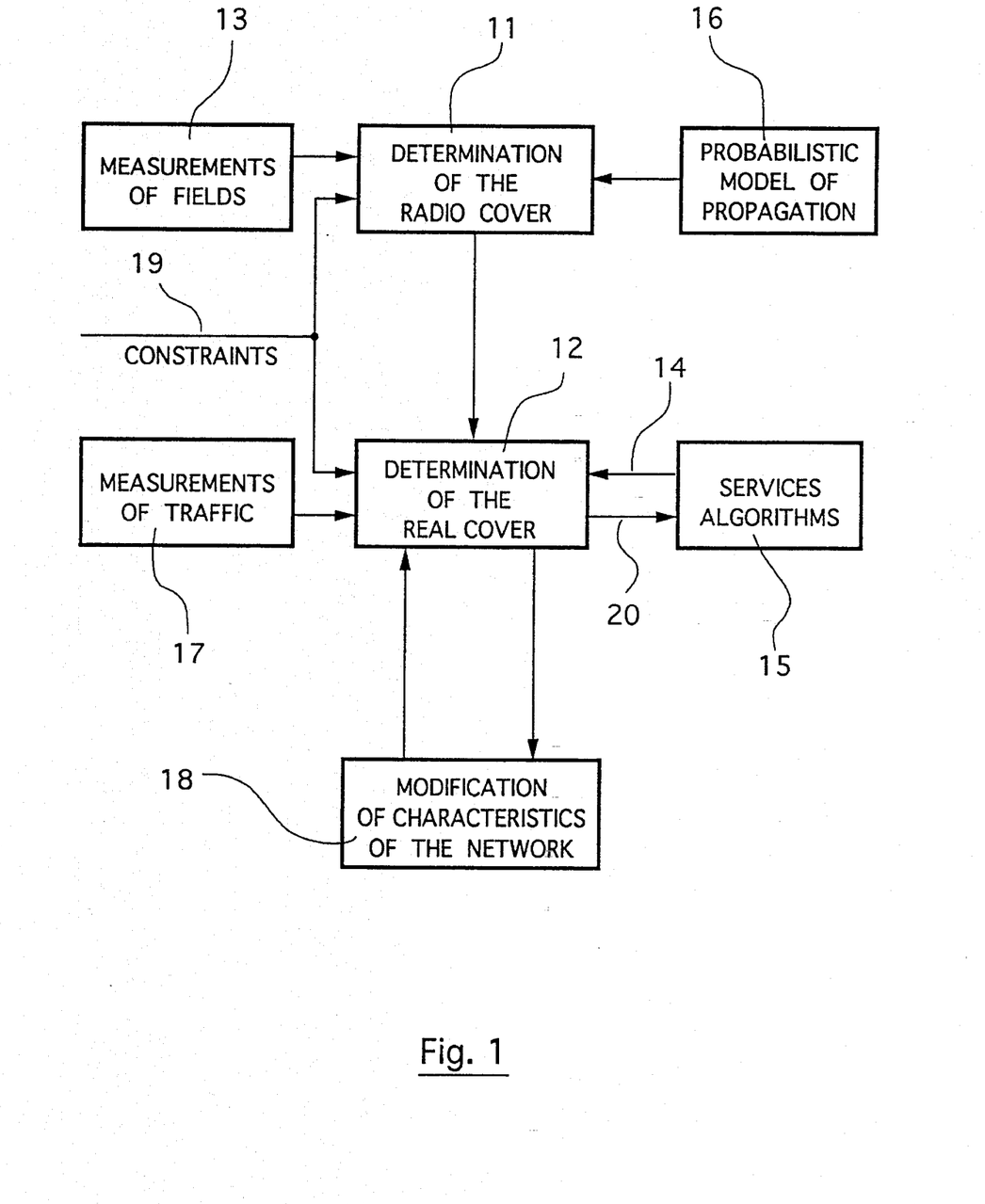
FIG. 1 illustrates the general principle of the method of the present invention.

FIG. 1 gives a simplified view of the characteristics of the method according to the invention. We shall describe this figure rapidly, before specifying the particular exemplary embodiments for each of the modules.

This method comprises two main steps:
— the determination 11 of the radioelectric or radio coverage;
— the determination 12 of the real coverage (taking account of the elasticity of the cells).

The first step 11 corresponds partially (for certain steps) to the known methods. It takes account of the field measurements 13, performed for example on 30% of the total surface area for which it is desired to know the coverage.

These measurements are then interpolated and/or extrapolated according to at least one new specific model described here below.

Finally, by means of a probabilistic model of propagation 16, the total coverage is determined. By the mixing of the simulated zones (simulated by means of the propagation model) and interpolated zones, a coherent general frame of the coverage of the network is obtained.

Advantageously, the method has a plurality of propagation models available, and the choice of a model for a coverage zone is done, as a function of the measurements 13 made, so as to optimize this determination step 11.

Secondly, the real overage of the network is determined (12). By taking account (14) of the different (AIH, reselection etc.) algorithms 15, and by considering the movements of the mobile units, it is indeed possible to obtain information, in a more precise way, on the real coverage of the cells and notably on the zones of overlapping between two cells.

It can indeed be seen that the traffic that flows in these overlapping zones may cause the load of a cell to vary in a major way. Thus, if a route corresponds, over a certain distance, to an overlapping zone, then the mobile units will preferably remain linked with the transmitter of the cell from which they have come (to avoid incessant AIHs). In this case, there is an extension of the radio coverage, due to the handover algorithms.

The real coverage, and hence the possibility of traffic, is different from the radio coverage determined by standard methods. By taking account of these algorithms and of the mobility of the transmitters and/or receivers, the method of the invention makes it possible to obtain knowledge of the real coverage of a cell with far greater precision and exactness.

It is also possible, according to the invention, to identify possible zones of poor reception or zones where AIHs are frequent (for example in the abovementioned case of a road corresponding to a zone of overlapping areas, and to modify (20) the algorithms accordingly.

This step 12 also makes it possible to dimension the resources of each cell (as signalling channels and phone channels) as a function of computations of simulations determined on the basis of the algorithms 15.

In order to optimize the step 12, the method advantageously takes account of the traffic measurements 17 which can be used to specify the statistical model of the movements used.

The invention also provides for a step 18 for the modification of one or more characteristics of the network. Thus, it is possible to have precise knowledge of the relative importance of the various characteristic parameters of the network, such as for example the power or the capacity of the cell, to assess the impact of a modification of these parameters with the aim of achieving control and optimization in the use of resources, as well as to obtain engineering-oriented forecasting.

Since there are known ways of carrying out modifications of antenna pattern, power and azimuth on these measurements made on the definitive sites, the modification of the engineering can be assessed in real time without its being necessary to redo the field measurements.

The finalizing of the system (i.e. the fine adjusting of the parameters of the algorithms) makes it possible to refine the characteristics of the network from the viewpoint of traffic distribution by simulating mobile units on traffic arteries.

The invention also makes it possible to take account of certain dictated constraints 19, such as the location of an antenna or an already existing cell.

In case of need, the procedures of coverage and traffic simulation may be iterated.

Figure 3:
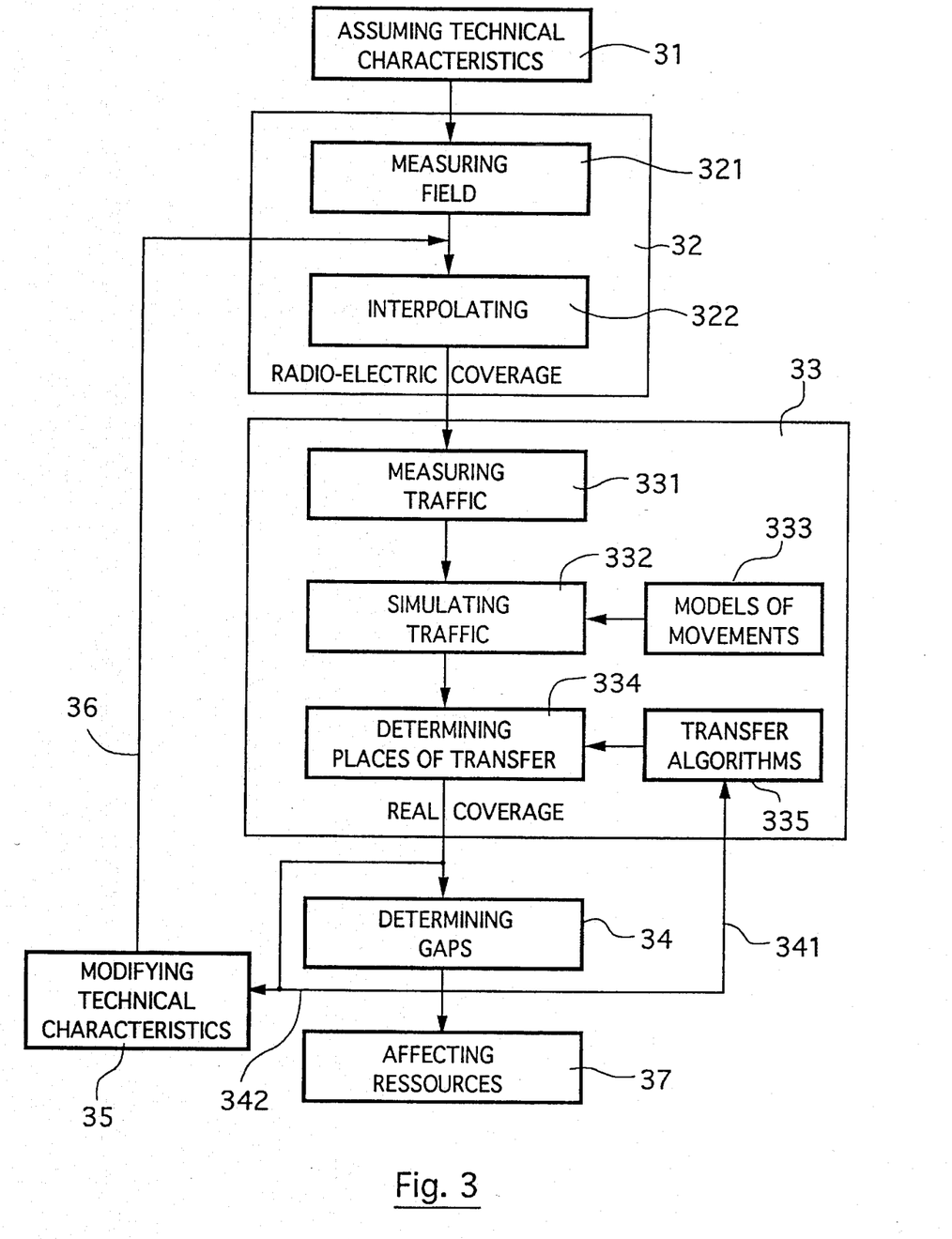
FIG. 3 illustrates a second embodiment of the method of the present invention.

FIG. 3 illustrates the method of the invention according to another embodiment of the present invention. Initially, the technical characteristics of the network are assumed at step 31 (location and characteristics of the base station). At step 32 a corresponding radio-electric coverage is determined. Preferably, this is accomplished by measuring the radio-electric field on part of the area at step 321 and completing the determination of the radio-electric coverage by interpolation/extrapolation at step 322.

Next, the real coverage is determined at step 33. This is accomplished by modifying the radio-electric coverage taking into account the movement of vehicles. This respect, traffic is measured at step 331 and simulated at step 332 making use of known models of movements from database 333. At step 334, places of transfer from a current cell to a new cell are determined as a function of the handover algorithms from step 335.

At step 34, gaps in the coverage are determined to modify the transfer or handover algorithms 335 and to modify technical characteristics of the base station at step 35. More particularly, the technical characteristics of the base station are modified at step 35 as a function of the real coverage and of the gaps in order to limit the number of handovers. The interpolation and real coverage steps are then iterated through loop 36, and the communication resources are affected at step 37 for each cell as a function of the real coverage.

The steps of the method of the invention may be embodied in various distinct applications of the invention, which may be used independently or in combination, namely:

—application 1: interpolation and extrapolation of the measurements;

—application 2: taking account of the mobility and simulation of the traffic;

—application 3: simulation;

—application 4: definition of the AIH algorithms;

—application 5: simulation on a road;

—application 6: definition of the localization zones;

—application 7: traffic flow

1. Field Measurements

The field measurements are made with a twofold purpose: determining the coefficients of the probabilistic model and obtaining the real coverage of a cell.

In the former case, the measurements are made on the basis of measurement sites installed at places considered to be representative of the environment, and the field measurements can be limited in number.

In the latter case, the measurements are made from a definitive site, and the number of measurements must be large enough to enable interpretation by interpolation.

The measurement protocol is the same irrespectively of the destination of the measurements.

For a given site, the roads on which the measurements will be made are selected. Using maps, the roads to be followed are digitalized. Then, the mobile unit that carries out the measurements takes position on the road at the point referenced as a starting point.

At each acquisition of measurements, the information elements on total distance travelled are recorded in a measurements file, at the same time as the information pertaining to the field in relation to the travelled distance.

The precision of the coordinates of the measuring point depends on the system (localization by satellite, gyroscope type onboard module, tuning-in data base etc.). Precision as regards the field measurements is determined by application of the theorem of the central limit and therefore depends on the sampling pitch.

For the adjustment of the parameters, the measurements have to be made from measuring sites that are most representative of the final environment of the sites.

The number of measurements used naturally has an impact on the results. For a cell, the reasonable number of measurements is 3,000 or 4,000.

2. The Traffic Measurements

The measurements of the traffic make it possible to estimate the geographical zones requesting traffic (goniometrical measurements) but also, for a given cell, they make it possible to know the behavior of the subscribers from the viewpoint of the consumption in Erlangs and of the distribution of the traffic towards the neighboring cells (traffic measurements on site).

In other words, as with the field measurements, the traffic measurements are used, firstly, as values of adjustment for a simulation and, secondly, for a comparison of reality with the results of the simulation: the scope of a model corroborated by reality can then justify its use in a region without measurements.

—Goniometrical Measurements

Using three sites provided with antennas, operations are carried out for the localization of occupation of the spectrum in the frequency band used by the mobile units. Each time that a communication is localized, a goniometrical position-finding operation is done on the transmitting point. When the measurements are made, the observation of the frequency band is continued from the last frequency studied. At the end of the spectrum, a loop is made to the start of the frequency range.

Files containing the coordinates of the traffic points are then available.

—Measurements of Traffic on Site

These measurements are obtained by the observation system of the network. They give the traffic that has flowed during a given time slot, as well as other statistics on the behavior of the traffic channels. It is also possible to have information available on the distribution of traffic towards the neighboring cells or coming from these neighboring cells.

These measurements can also advantageously be complemented by systems measurements.

3. Interpolation and Extrapolation of the Measurements (application 1)

The field measurements are spread out among the roads. To determine the associated coverage zones, it is necessary to know the measurements on a regular network (every 100 m for example).

The interpolation will give a view that is closer to reality but cannot be carried out at too great a distance from the measuring points.

The extrapolation, if well defined, makes it possible to obtain knowledge of the value of the field at as great a distance as is desired in the zone of study.

By way of examples, four exemplary methods of interpolation/extrapolation, capable of being implemented, are given here below.

—Method 1

The four, three or two points closest to a point of the meshing, inside a circle with a given radius, are determined. The value interpolated at the point M is equal to:

$$E_m = \frac{\frac{E_1}{d_1} + \frac{E_2}{d_2} + \frac{E_3}{d_3} + \frac{E_4}{d_4}}{\frac{1}{d_1} + \frac{1}{d_2} + \frac{1}{d_3} + \frac{1}{d_4}}$$

where $E_i$ is the value of the field at the point number i (i=1 to 4), at a distance $d_i$ from the meshing point M.

The value at a point of the meshing is taken as being equal to the mean of the values within a circle with a given radius, in the event of dense data.

—Method 2

The interpolation is done in several steps:

1. The values inside a circle with a given radius $R_1$ (typically $\sqrt{2/2}$ times the longest side of the meshing, so as to cover the plane with disks) or inside a block centered on the meshing point considered, are averaged to give the value at the point of the meshing.

2. For the points of the meshing whose value is not sought, the procedure consists in carrying out an interpolation on the basis of the values of the known meshing points (coming from the step 1) that occur inside a circle with a radius $R_2$, and in each of the four quadrants about the point to be interpolated. Between two points A and B on either side of M, for which we have the values of the fields $E_A$ and $E_B$, the field $E_M$ in M is computed by:

$$E_M = E_A + \left[ \frac{X_M - X_A}{X_B - X_A} \right] E_B$$

where $X_I$ designates the abscissa of the point I.

The same procedure is used with the other points and for the ordinate values. In the optimum cases, there are two interpolated values available, for which the average is taken.

If there is only one point, or if there are two points but in opposite quadrants, the nearest point is taken.

—Method 3

If there is only one point of measurement in the circle considered, an interpolation is done by deduction, from the value of the field $E_1$ located at a distance $D_1$ from the base station, of the value of the constant CSTE such that $E_1 = CSTE1 + \alpha \log_{10} D_1$, where $\alpha$ is a given coefficient (−35.5 by default). Then, the distance $D_2$ from the meshing point to the base station is computed, and $E_2 = CSTE2 + \alpha \log_{10} D_2$ is deduced.

If not, for a given $\alpha$, there are several values of constants available: CSTE1, CSTE2, CSTE3, CSTE4, . . . A computation is then made of the mean value of this constant, i.e. CSTM, as $E_i$ is computed in the modules 1 and 2, and the interpolated field is equal to:

$$E_M = CSTEM + \alpha \log_{10} D_M,$$

where $D_M$ is the distance from the point to the base station.

—Method 4

The points of the meshing are divided into a given number (NC) of classes. With the class K, there is associated a field model of the type:

$$E_k = CSTE_k \alpha_k \log_{10} d$$

where $\alpha_k$ and $CSTE_k$ are constants. During the interpolation/extrapolation, if a point of the meshing belongs to the class k, it is the associated model that determines the value of the received field.

4. Models of Propagation

Numerous models of weakening are known. They can be classified under two categories, depending on whether or not there is correction for the diffraction due to the edges (which induces greater complexity in the computation algorithm). The received power (in dB) at a point (x,y) by the mobile unit is equal to:

$$P_r(x,y) = P_e - A(x,y) - J(v) - G(\rho) - H(\chi)$$

where $A(x,y)$ is the simple weakening, $J(v)$ the correction due to the thin edges, and $G(\rho)$ and $H(\chi)$ the corrections due to the edges with rounded peaks.

The weakening of the power as a function of the distance $d(x,y)$ from the mobile unit to the transmitter varies as $1/d^\alpha(x,y)$, where $\alpha$ ranges from 2 (in open space) to 4 (maximum value in an urban zone).

Various models are proposed for the weakening, such as the open space model, the flat terrain model, the synthetic model (Egli, Kozono/Watanabe, Dammasso, etc.) or the Okumara/Hata model.

Again in a known way, with a given relief, there is associated a parameter $v$, $\rho$ or $\chi$, then used to compute the weakening that is supplementary to a simple weakening.

The following cases are distinguished:
—sharp edge;
—two edges (Deygout or Epstein-Peterson method);
—three edges or more (Edwards/Durkin and Blomquist/Lade models).

The value of the probabilistic models of propagation used is that they can be used to make forecasts of coverage, without its being necessary to carry out systematic field measurements that are costly in terms of resources, men and equipment.

Probabilistic tools are used to determine the relevance of a model, and the coefficients of the probabilistic model of propagation, to adapt it as efficiently as possible to the region under study. To this end, the parameters to be taken into account are chosen, and then the linear model is written. Finally, by comparison with field measurements, the relevant parameters and the proportions in which these parameters come into play are determined by means of the Fisher-Smedecor statistical method.

The models presented can be improved by taking account of new significant parameters, or more simply by adapting the coefficients of a model.

It is then possible, by methods of linear regression, to find the values of the coefficients of the probabilistic model of propagation studied.

5. Taking account of the mobility and simulation of the traffic (application 2)

According to an essential characteristic of the invention, the determining of the characteristics of the network takes account of the movement of the mobile units and of the traffic.

By simulation of the mobility of the subscribers, their consumption and the network (zones of coverage, implementation of the AIH, state of the cells, etc.), a prediction is made of the behavior of the network and its performance characteristics are analyzed. The control thus obtained can be used to cope with the variations affecting the network and above all to overcome the elasticity introduced into the engineering by the implementation of algorithms.

Between a pragmatic approach (which is risky) and experimentation (which is costly), the method of the invention provides the most reasonable solution in terms of cost/efficiency ratio.

The desired aim is notably that of obtaining the dimensioning of the stations (in terms of signalling and telephony channels). What has to be done therefore is to simulate the various functions of the network and to deduce therefrom the load coming from each of them:
—random access of the mobile units,
—paging of the mobile units,
—localization,
—signalling for setting up of calls,
—AIH,
depending on the management of the communications (OACSU, NOACSU, HOACSU).

To this end, the simulation will take account of fictitious channels, the following will be distinguished: the call set-up channel EA, the localization signalling channel LOC, and the short message transfer channel MC; similarly, for the traffic channels, the following will be distinguished: the AIH channel and the NEW channel to enable the assessment of the proportion of channels occupied by the AIT and those occupied by new traffic.

As an example, the appendix 2 gives exemplary digital values that can be taken into account to describe the statistical and temporal behavior of the mobile units and to modelize a typical network.

On the basis of the data elements on the behavior of the network and of the mobile subscribers, it is possible to compute occurrences of the events considered in the statistics as a function of these parameters alone (percentages) and of a fundamental occurrence. The following is chosen for example:

$\lambda$=occurrence of efficient outgoing communication (leads to a ringing) per mobile unit, per second.

The different occurrences that can be determined from this value are given in appendix 2.

To simplify the notations, $\lambda_k$ is used to designate the occurrence of a state and $T_k$ is used to designate the total mean duration in this state, i.e. the mean duration in this state plus the duration of signalling if any. If T is the total duration of the simulation, the total number of occurrences of the state k during T is equal to $\lambda_k T$. The method of the invention can also deliver the following information elements:

. Probability of being in a state k:

This is the ratio of the number of mobile units in the state k during T to the total number of mobile units during T, giving NT.

For mobile units on stand-by watch, we obtain simply:

$$p_k = \frac{N(\lambda_k T) T_k}{NT} = \lambda_k T_k$$

giving: $PMS = \lambda_{SOM} T_{SOM}$ and $PMV = \lambda_{VEI} T_{VEI}$ (where PMS=probability that the mobile unit is off and PMV=probability that the mobile unit is on stand-by watch).

For mobile units that are communicating, it is necessary to distinguish the different cases. With the formula of the total probability, we find, after simplifications by NT:

$$PMC = \sum_{k \neq SOM, VEI} \lambda_k T_k$$

where PMC: probability that the mobile unit is in a state of communication. This formula makes it possible to determine the fundamental occurrence as:

$$\lambda = \sum_{k \neq SOM, VEI} \lambda_k / \sum_{k \neq SOM, VEI} c_k = PMC / \sum_{k \neq SOM, VEI} c_k T_k$$

A mobile unit that is either on stand-by watch or communicating is said to be active.

. Probability of passing to the state k:

This is the ratio of the number of occurrences of the state k during T to the total number of occurrences. After simplification by T:

$$P_k = \frac{\lambda_k}{\sum_j \lambda_j}$$

6. Computation of the magnitudes linked to the events

Using relatively simple computations of queues and of estimation, it is possible to assess the load of the different signalling and telephony channels.

. Service of the traffic

We consider a cell with C channels, having a waiting room with a size N. The service, with a duration of $1/\mu$, is distributed according to an exponential law having the parameter $\mu$.

The fundamental parameters of a system using a waiting room are the probabilities of blocking, waiting, waiting for longer than a period of time $t_0$ in the waiting room of the system, and the mean time $\overline{T}_a$ of waiting in the queue.

The following are determined notably by taking the traffic to be equal to A:

a) the probability of having n channels occupied in the cell:

$$p(n) = p(O) A^n/n! \text{ if } O \leq n \leq C$$
$$p(n) = p(O) A^n (C^{n-c} \cdot C!) \text{ if } C \leq n\ C + N \text{ with}$$

$$p(O) = \frac{1}{\sum_{k=0}^{C} \frac{A^k}{k!} + \sum_{k=C+1}^{C+N} \frac{Ak}{C^{k-c} C}}$$

else: p(n)=percentage of the time of the simulation where n channels of the cell are occupied.

The mean number of mobile units in the system is equal to:

$$m = \sum_{n=1}^{C+N} np(n)$$

b) probability of blocking: this is the probability that a mobile unit arriving in the system will find all the resources occupied, and the waiting room full:

$$p_b = p(O) \frac{A^{C+N}}{C^N \cdot C!}$$

or else: $P_b$=percentage of the time of the simulation where all the resources are occupied.

The mean number of channels occupied is equal to:

$$b = \sum_{n=1}^{C} np(n) + \sum_{n=C+1}^{C+N} cp(n)$$

c) probability of waiting (the probability that a mobile unit will have to wait for the allocation of a resource):

$$p_a = \sum_{k=C+1}^{C+N} p(k) = p(O) \frac{A^C}{C!} \left[ \frac{1 - \left[\frac{A}{C}\right]^N}{1 - \frac{A}{C}} \right]$$

or else: $P_a$=percentage of the time of the simulation where a mobile unit waits for a resource.

. Function of updating of localization

If the density $\rho$ of mobile units is constant in the computation region (localization cell or zone likened to circles) and if the speeds of the mobile units are mutually independent and follow the same law of density $f_v$ with average density V, with uniformly distributed orientations, then the rate of mobile units crossing the boundary with a length L of the region with a surface area S is equal (after integration with respect to the speed, the angle and the boundary) to:

$$(\rho V L)/(\pi \rho S) = (V L)/(\pi S)$$

The occurrence, per mobile unit and per second, of the localization updatings generated in a zone of localization having N cells, by the active mobile units, is then equal to:

$$\lambda_{LOC} = PMV(4V/(3\sqrt{3}\ R))(n + 1/n)$$

or else, according to the formula given in the document "Final Report of the Signalling Expert Group", Stockholm, April 1987:

$$\lambda_{LOC} = PMV \frac{V}{\pi} \frac{2\left[1 - \frac{N-1}{2N}\right]}{R}$$

where $$L = 2\pi R \left( 1 - \frac{N-1}{2N} \right)$$

is a semi-empirical value specifying the perimeter of the localization zone containing N circular cells with a radius R. Should the cells be hexagonal and recorded in a circle with a radius R, then L will be chosen to be equal to 65 (1− (2n−1/3n)).

It is also possible to choose 3. $\lambda_{LOC}$ as being equal to the number of mobile units that carry out an updating of localization during the simulation divided by the mean number of active mobile units and the duration of the simulation, the mean number of active mobile units being equal to $\Sigma k^*$ (% of time when k mobile units are active), k varying from 0 to the number of simulated mobile units.

. Search function of the mobile units

If N is the number of cells in the localization zone, NPM is the number of mobile unit paging messages, in a cell, per incoming call attempt intended for a mobile station located in another cell of the localization zone, F is the maximum number of paging messages per incoming call attempt, and NMA is the mean number of subscribers who can be served simultaneously, while the occurrence of paging is the sum of three possible configurations, and is equal to:

$$\lambda_{PAC} = (\lambda_{AEC} + \lambda_{AEA})((N-1)NPM + (F-1)PAEA + 1/PMV$$

where $\lambda_{PAC}$=number of paging operations during the simulation/(mean number of active mobile units * duration of the simulation).

The mean number of paging operations per time interval DS is:

$$\Lambda_{PAC} = NMA\ DS\lambda_{PAC}$$

7. Simulation of radio coverages

An essential data element for the simulation of the cellular networks is the simulation of the radio coverage of each cell of the network. Starting from a probabilistic model of propagation, and from the technical characteristics of a station, there are known ways of computing the power received at each point of the meshing. All the files of power values received, associated with the stations, make it possible to compute the signal-to-interference ratio C/I in taking account of the filter for the stations that have frequencies on adjacent channels.

With these files, there are known ways of plotting the radio coverage zones as a function of the criterion C (received power) or C/I (received power/interference), or of a combined criterion of both these factors. Access is thus had to:

—nominal cells without control of transmission power,
—nominal cells with control of transmission power,
—nominal cells and coverage zones,
—nominal cells and C/I zones,
—coverage zones,
—coverage zones and C/I zones,
—C/I zones.

8. Simulation of the Coverages related to the Mobility

The plotting of the real coverage zones is defined as being made on the basis of one of the above three criteria, and at least one additional criterion. This criterion may be:

—the result of the behavior of a mobile unit in the zone of radio coverage as a function of the AIH algorithm,
—the shift in the coverage so that the traffic capable of flowing is below a maximum threshold, with measurement of the resulting variation in traffic and the variation in surface area.

For the second criterion, the reception threshold must be made to vary, with the traffic being distributed uniformly on the surface of the cells.

For the first criterion, the procedure is more complicated:

—a threshold of received power is set for the triggering of the AIH algorithm, and the points of the meshing corresponding to the boundary demarcated by this threshold are deduced therefrom.
—the mobile units are shifted by a distance V*TM where V is the mean speed of the mobile units, and TM is the mean measuring time, starting from each point of the boundary and along the normal to this boundary.
—at the point of arrival of the mobile unit, the received power is known, and to this power there is added, if necessary, a centered Gaussian noise. This value is given as an input for the AIH algorithm.
—if the mobile unit changes cells, the target cell is associated with the outgoing point (to assess the distribution of traffic on the adjacent cells), and the operation passes to the next point of the boundary. If not, a recomputation is made of the normal to the curve of isopower corresponding to the current position, and the computation procedure is resumed.

Another approach consists in further simulating mobile units on the roads, and in observing the locations of the AIHs on these roads. For a set of chosen roads, it is then possible, by interpolation of the locations of outputs, to determine the real coverages (incoming or outgoing) as a function of the direction in which the routes are travelled.

9. Simulation of the movement of the mobile units

The mobile units are characterized by starting points, laws of movement and speeds.

—the starting points of the mobile units are obtained by random distribution, or else on the basis of traffic data in terms of number of mobile units proportionally to the traffic handled by the cells, and in terms of position uniformly on the surfaces of these cells.

—the speeds are generated randomly according to a relationship chosen from the library of relationships.

—the model of the movement of the mobile units is:

* either a random step, involving the choice of an angle of orientation according to a law and the choice of a length of movement according to a law,
* or it is a relationship of flow and reflow of the mobile units in the region, with the mobile units going towards a target point or fleeing from it,
* or again it is an empirical model using the traffic data base.

10. Location and Duration of the Simulations

The presence of roads (only the orbital roads, national highways and motorways are considered) induces a non-negligible load for the cells that they cross. These roads have to be processed differently, for their characteristics are different (higher speeds of mobile units, "rectilincar" paths, etc.). The simulation of mobile units on roads, complementary to mobile units off roads, having a speed of movement different from that of mobile units off roads, is taken into account.

The real duration of the simulation, the number of mobile units on the roads and the number of mobile units off the roads are parameters of initializations of the application.

11. Simulation Procedure (application 3)

On the basis of the statistics of the network and of the type of management of the communications, a computation is made, using the formulae of paragraph 5, of the occurrences of $\lambda_k$ (apart from the stand-by watch and off states which are given). These occurrences make it possible to simulate the activity of the mobile units and then to deduce the telephony and signalling traffic therefrom.

The mobile units are initialized on stand-by watch for a duration weighted by a factor u drawn uniformly between 0.9 and 1, and in proportions in keeping with the initial percentages so as to prevent signalling on a massive scale.

Initially, a simulation (static mode) is done during which the parametrizable technical characteristics of the stations are not modified. The free progress of the network in the face of the generated demand is then observed:

— if the number of channels is known, the traffic that has flowed, the possible flow of traffic and the possibilities of blocking and waiting are deduced therefrom;

—if the number of channels is not known, a set of conditions on the probability of blocking (PBT), the probability of waiting (PAT), and the probability of waiting for more than TA seconds (PATAT) on the traffic channel, and on the probability of blocking (PBS), the probability of waiting (PAS), and the probability of waiting more than TA seconds (PATAS) on the signalling channel, of the following type:

$$PBT \leq CBT$$
$$PAT \leq CAT$$
$$PATAT \leq CATAT$$
$$at*PBT + bt*PAT + ct*PATAT \leq CT$$
$$PBS \leq CBS$$
$$PAS \leq CAS$$
$$PATAS \leq CATAS$$
$$as*PBS + bs*PAS + cs*PATAS \leq CS$$
$$a*PBT + b*PAT + c*PATAT + d*PBS + e*PAS + f*PATAS \leq CG$$

with at, bt, ct, as, bs, cs, a, b, c, d, e, f of the coefficients equal to 1 or 0, and CBT, CAT, CATAT, CT, CBS, CAS, CATAS, CS and CG, which are values of constraint ranging from 0 to 1 and are fixed by the user, can be used to determine the dimensioning of the traffic and signalling channels, the lengths of the queues and the useful traffic. The algorithm computes the different possibilities and, in the search for a solution, minimizes the number of channels in relation to the size of the queues.

In a second stage, it is possible to carry out a simulation of the network (dynamic mode) during which the cells are dimensioned and the parametrizable technical characteristics may be modified according to the two criteria of control of transmission power and of rate of traffic load of the base stations. Thus, the development of the network under constraints, and the effect of a designated parameter on the network and its consequence on the management of resources are observed.

If we take statistics corresponding to an estimation of the behavior of a network at a future date, the simulation as described in the above paragraphs can be used to make the traffic prediction.

12. Definition of the MH Algorithms

The procedure of description of the algorithms can be used to simulate classes of complex algorithms implemented in the network, so as to select the most efficient one.

The parameters X to be supervised during the simulation are chosen from among five criteria:

C=field received by the mobile unit,
D=distance from the mobile unit to the station;
T=rate of load of the traffic from the station;
I=Ca ratio associated with the station at the point at which the mobile unit is located;
F=function to be configured as described here below.

Gaussian noise

A Gaussian noise with a average $m_x$ and a standard deviation $\sigma_x$ may be advantageously added to the X values considered.

Period of response of the Network

For greater precision of simulation, it is possible to apply an AIH with a delay period called and AIH_period, AIH_period representing the processing time of the network.

Safety period

To prevent repeated AIHs, if an AIH has been performed at t0, then a second AIH cannot take place before t0+safety_AIT.

The algorithm to be followed to execute an AIH is parametrized as follows (each cell possesses its own sets of values of the comparison parameters considered here below):

step 1: configuration of F
a) choice of the variable x (C, D, T, or I) on which F depends,
b) description of F with NV values $(S_i, V_i)$ to be fixed, indicating that if x belongs to $[S_i, S_{i+1}]$ then F(x) is equal to $V_i$.

step 2: criterion of the triggering of the algorithm

This step corresponds to a logic OR step: there is the triggering of an AIH request as soon as one of the parameters DX verifies its criterion. This criterion may be "always" or "if X of the current station SC exceeds a threshold SD(X, SC)".

If a parameter X is the cause of a triggering, the associated variable CAUSE_X assumes a given (but modifiable) value. The value of CAUSE_X for the other parameters is zero. The value of this variable can be used to favor the AIH on cells having a most efficient value of the parameter X that has caused the AIH.

step 3: filtering of the target cells

This step can be used to select the cells capable of receiving the mobile unit. Either the "none" criterion is applied and all the cells are selected, or the only cells kept are the cells SV verifying an inequality relating to X(SV), an accessibility threshold SA (X, SC,SV), a hysteresis HO(SC, SV), CAUSE X, and a corrective term for the power values of transmission of the mobile units permitted in the cells SC and SV.

step 4: final selection

The cell selected from among the neighboring cells SV is the one that has the best field from among the selected cells.

For each criterion X supervised, a definition is made of NOC(X) which is the priority number, or application number, of this criterion, and NBS(X) which represents the number of stations chosen at the end of the application of the criterion X.

The cells are chosen by application of the following rule:
for NOC=1 to 5
choose the criterion X such that NOC(X)=NOC apply the inequality defined in the step 3,
among the stations verifying the inequalities, choose the NBS(X) values having the best field, end of loop.

13. Simulation on a road (application 5).

Once the algorithm has been configured, and a set of routes has been selected, it is possible to simulate the movement of a mobile unit (its speed is set) on this road. The mobile unit is in a state of permanent communication, and the rate of analysis can be fixed.

It is possible to display the locations of the AIHs. For example, the mobile unit colors the road on which it moving with the color of the cell that serves it.

An output in graph form enables the display of the variation of the field received (y-axis values in dBm) along the road travelled (x-axis values in km).

14. Definition of the zones of localization (application 6)

The determining of the localization zones makes it possible to minimize the signalling traffic due to the paging of mobile units for incoming communications, which increases with the number of cells in the localization zone, and to minimize the traffic due to updatings of localization (recording of mobile units during the changing of localization zones) which diminishes when the number of cells increases.

For a chosen set of cells, the localization zones are determined so as to minimize a function associated with the paging traffic and localization updating traffic.

The procedure of searching for a solution can advantageously be accelerated by indication of the following parameters:

—minimum number of cells per localization zone,
—maximum number of cells per localization zone,
—minimum number of localization zones,
—maximum number of localization zones,
—groups of cells belonging to the same localization zone,
—a cell of a localization zone is necessarily in the list of cells neighboring a cell of this zone (thus, localization zones not in the neighborhood of one another are avoided).

For configured algorithms, for a given set of localization zones, a simulation is done. The optimum solution, as described in this paragraph, taking account of the characteristics of the network, is then determined.

15. Flow of traffic (application 7)

To determine the extent of the flow of traffic (AIH or localization updating), it is possible, apart from a standard simulation, to proceed as follows:

A mobile unit that is constantly communicating (flow of

AIH traffic) or in constantly on stand-by watch (flow of localization updating operations) is shifted N times on a route passing through all the discretization meshes of the field.

Since the zone studied is rectangular, the route starts at one corner and follows all the meshes, horizontally and then vertically, along one diagonal and then along the other diagonal.

The instances of the changing of cells are counted up and the flows are known.

| APPENDIX 1 | | | | | |
|---|---|---|---|---|---|
| * | not. * Definition | * | val. | * | |
| * | PMS * % mobile units at rest | * | 0.400 | * | |
| * | PMV * % mobile units in stand-by watch state | * | 0.575 | * | |
| * | PMC * % mobile units communicating | * | 0.025 | * | |
| * | PMC + PMV + PMA = 1 | | | * | |
| * | PASE * ratio outgoing calls with comm./comm. calls | * | 0.80 | * | |
| * | PASC * % outgoing calls leading to a comm. | * | 0.70 | * | |
| * | PASM * % outgoing calls without response | * | 0.20 | * | |
| * | PASO * % outgoing busy calls | * | 0.10 | * | |
| * | PASC + PASM + PASO = 1 | * | | | |
| * | PAEE * ratio incoming calls with comm./comm. calls | * | 0.20 | * | |
| * | PASC * % incoming calls leading to a comm. | * | 0.55 | * | |
| * | PAEM * % incoming calls without response | * | 0.05 | * | |
| * | PAEA * % incoming calls without wait by called party | * | 0.40 | * | |
| * | PAEC + PAEM + PAEA = 1 | | | * | |
| * | PASE + PAEE = 1 | | | * | |
| * | PCPH * % telephone communications | * | 0.90 | * | |
| * | PCSL * % long outgoing communications | * | 0.20 | * | |
| * | PCSM * % medium outgoing communications | * | 0.70 | * | |
| * | PCSC * % short outgoing communications | * | 0.10 | * | |
| * | PCEL * % short incoming communications | * | 0.30 | * | |
| * | PCEM * % medium incoming communications | * | 0.60 | * | |
| * | PCEC * % short incoming communications | * | 0.10 | * | |
| * | | | | * | |
| * | PCTD * % communications of data transmissions | * | 0.05 | * | |
| * | PTSL * % long outgoing data trans. | * | 0.30 | * | |
| * | PTSM * % medium outgoing data trans. | * | 0.50 | * | |
| * | PTSC * % short outgoing data trans. | * | 0.20 | * | |
| * | PTEL * % long incoming data trans. | * | 0.30 | * | |
| * | PTEM * % medium incoming data trans. | * | 0.50 | * | |
| * | PTEC * % short incoming data trans. | * | 0.20 | * | |
| * | | | | * | |
| * | PCMC * % communications for short messages | * | 0.05 | * | |
| * | PCPH + PCTD + PCMC = 1 | | | * | |
| * | TLOC * time for one localization updating | * | 003 s | * | |
| * | TTAI * time for setting up one AIH | * | 015 s | * | |
| * | SAO * duration of ringing for busy calls | * | 000 s | * | |
| * | TPAF * propagation time of calls in fixed mode | * | 015 s | * | |
| * | SASC * duration of ringing for PASC | * | 015 s | * | |
| * | SASM * duration of ringing for PASM | * | 030 s | * | |
| * | TSAS * outgoing calls sipalling time | * | 3 s | * | |
| * | SAEC * duration of ringing for PAEC | * | 005 s | * | |
| * | SAEM * duration of ringing for PAEM | * | 030 s | * | |
| * | TSAE * incoming calls signaling time | * | 4 s | * | |
| * | TATC * waiting time for one TCH | * | 001 s | * | |
| * | DCSL * mean duration of long outgoing coms | * | 180 s | * | |
| * | DCSM * mean duration of mean outgoing coms | * | 120 s | * | |
| * | DCSC * mean duration of short outgoing coms | * | 060 s | * | |
| * | DCEL * mean duration of long incoming coms | * | 240 s | * | |
| * | DCEM * mean duration of mean incoming coms | * | 180 s | * | |
| * | DCEC * mean duration of short incoming coms | * | 120 s | * | |
| * | | | | * | |
| * | STD * duration of ringing for data trans. | * | 002 s | * | |
| * | DTSL * mean duration long outgoing data trans | * | 090 s | * | |
| * | DTSM * mean duration medium outgoing data trans | * | 060 s | * | |
| * | DTSC * mean duration short outgoing data trans | * | 030 s | * | |
| * | DTEL * mean duration long incoming data trans | * | 090 s | * | |
| * | DTEM * mean duration medium incoming data trans | * | 060 s | * | |
| * | DTEC * mean duration short incoming data trans | * | 030 s | * | |
| * | SMC * ringing duration, short messages | * | 000 s | * | |
| * | DCMC * mean duration of short messages | * | 001 s | * | |
| * | DSOM * mean duration of rest | * | 1500 s | * | |
| * | DVEI * mean duration of stand-by watch | * | 2000 s | * | |

APPENDIX 2

\* Occurence of outgoing call leading to a comm.:

$\lambda_{ASC}$ = PASC $\lambda$
occurrence of long telephone type communication:
$\lambda_{CSL}$ = PCPH PCSL $\lambda_{ASC}$
occurrence of medium telephone type communication:
$\lambda_{CSM}$ = PCPH PCSM $\lambda_{ASC}$
occurrence of short telephone type communication:
$\lambda_{CSC}$ = PCPH PCSC $\lambda_{ASC}$
occurrence of long data transmission type communication:
$\lambda_{TSL}$ = PCTD PTSL $\lambda_{ASC}$
occurrence of medium data transmission type communication:
$\lambda_{TSM}$ = PCTD PTSM $\lambda_{ASC}$
occurrence of short data transmission type communication:
$\lambda_{TSC}$ = PCTD PTSC $\lambda_{ASC}$
occurrence of short message type communication:
$\lambda_{CMC}$ = PCMC $\lambda_{ASC}$ \* Occurrence of outgoing call without response:

$\lambda_{ASM}$ = PASC $\lambda$

\* Occurrence of outgoing call busy:

$\lambda_{ASC}$ = PASO $\lambda$

\* Occurrence of incoming call leading to a com.:

$$\lambda_{AEC} = \frac{PASC\ PAEE}{PASE} \lambda$$

occurrence of long telephone type communication
$\lambda_{CSL}$ = PCPH PCSL $\lambda_{AEC}$
occurrence of medium telephone type communication
$\lambda_{CSM}$ = PCPH PCSM $\lambda_{AEC}$
occurrence of short telephone type communication
$\lambda_{CSC}$ = PCPH PCSC $\lambda_{AEC}$
occurrence of long data transmission type communication:
$\lambda_{TSL}$ = PCTD PTSL $\lambda_{AEC}$
occurrence of medium data transmission type communication:
$\lambda_{TSM}$ = PCTD PTSM $\lambda_{AEC}$
occurrence of short data transmission type communication:
$\lambda_{TSC}$ = PCTD PTSC $\lambda_{AEC}$
occurrence of short message type communication:
$\lambda_{CMC}$ = PCMC $\lambda_{AEC}$ \* Occurrence of incoming call without reaching called party:

$$\lambda_{AEA} = PAEA \left( \frac{PASC\ PAEE}{PASE\ PAEC} \right) \lambda$$

\* Occurrence of incoming call without response:

$$\lambda_{AEM} = PAEM \left( \frac{PASC\ PAEE}{PASE\ PAEC} \right) \lambda$$

What is claimed is:

1. A method for planning cells of a radio cellular communication network, each cell comprising a base station for controlling a plurality of mobile units in a geographical cover zone covered by said station, handover selection to manage changes of base station controlling a mobile unit when said mobile unit passes to the cover zone of a neighboring cell, said method comprising, the each of said cells, the steps of:

assuming a geographical location and technical characteristics for the base station of said cell;

estimating a radio-electric cover of said base station;

determining a real geographical cover zone of said base station, comprising the steps of:

simulating movements of mobile units in said cell;

determining places of transfer of said mobile units to a neighboring cell, from said handover selection, as a function of said simulated movements; and obtaining a real geographical cover zone of said cell, by modifying said radio-electric cover taking into account said places of transfer; and affecting transmission resources to said cell as a function of said real geographical cover zone.

2. A method according to claim 1, further comprising a step of determining localization zones corresponding to a set of at least two cells, a central control system of said network associating to each of said mobile units the localization zone in which the mobile unit travels, and said localization zones being defined so as to limit the transfers of localization zones, taking into account said simulated movements.

3. A method according to claim 2, wherein said step for the determining of localization zones determines said localization zones so as to minimize the signalling traffic.

4. A method according to claim 1, wherein said handover selection comprises:

automatic inter-cell handover for mobile units that are in process of communicating and changing their broadcasting cell;

reselection of a cell, for mobile units changing from an off state, in which no operation is possible, to a stand-by watch state, in which the mobile unit can receive a call, or from a stand-by watch state to a communicating state, in which the mobile unit can communicate, so as to enable transmission and reception of information elements.

5. A method according to claim 4, comprising a step for the selection of an automatic inter-cell handover algorithm from among at least two automatic inter-cell handover algorithms.

6. A method according to claim 1, wherein said step of simulating movements takes account, for each mobile unit, information elements selected from the group comprising:

starting point of said mobile unit;

speed of said mobile unit;

law governing the movement of said mobile unit;

direction of said mobile unit; and state of the mobile unit.

7. A method according to claim 6, wherein said information on the state of mobile unit is selected from the group comprising the following states:

in communication mode;

in stand-by watch mode; and out of stand-by watch mode (or at rest).

8. A method according to claim 1, wherein said step of simulating movements takes account of at least one of the pieces of information belonging to the group comprising:

the position of the mobile unit on a traffic route or off it;

the importance of said traffic route.

9. A method according to claim 1, wherein said step of simulating movements takes account of an information element for the geographical characterization of the zone of the base station.

10. A method according to claim 1, wherein said step of simulating movements implements at least one statistical model of the movement of said mobile units in said cells.

11. A method according to claim 1, comprising a step of traffic measurement, providing information for said step of simulating movements.

12. A method according to claim 1, comprising a step of identifying gaps in the coverage of said network, in which no signal can be received by a mobile unit.

13. A method according to claim 12, comprising a step of modification of said handover selection, on the basis of information provided by said step of determining of gaps in coverage, so that said gaps in coverage are taken into account during the assigning of the cells.

14. A method according to claim 1, wherein said step of estimating a radio-electric cover is preceded by a step of determining a model of propagation, taking account of radio-electric field values measured.

15. A method according to claim 14, wherein said step for determining a propagation model weights said measurements as a function of their representativity in terms of radio coverage.

16. A method according to claim 14, wherein said step of estimating a radio-electric cover includes at least one of the following operations:

measurements of radio-electric field;

interpolation of the radio coverage from said measurements, to geographical zones close to said measurements;

extrapolation of said radio coverage from said measurements;

choice of a propagation model from among at least two available models, and an operation to determine a total radio coverage, on the basis of at least one of the pieces of information belonging to the group comprising said measurements, said pieces of information belonging to the group comprising said measurements, said interpolations, said extrapolations made and the propagation model chosen.

17. A method according to claim 16, wherein said extrapolation step includes the following steps:

—classification of the measurements into at least two groups;

—application of a distinct model of interpolation for each of said groups.

18. A method according to claim 16, wherein said measurement operation relates to at least 30% of said total coverage.

19. A method according to claim 16, wherein said interpolation step includes the following steps:

—classification of the measurements into at least two groups;

—application of a distinct model of interpolation for each of said groups.

20. A method according to claim 1, comprising a step for the modification of at least one of the characteristics of devices selected from the group comprising transmitters and receivers.

21. A method according to claim 20, wherein said characteristics of said devices belong to the group comprising:

antenna pattern;

power;

azimuth;

number and/or value of the transmission frequencies;

number of service channels; and number of communication channels.

22. A method according to claim 1, wherein said method takes account of at least one of the constraints belonging to the group comprising:

—predefined location of a device selected from the group comprising transmitters and receivers;

—relief;

—predefined form of at least one cell.

23. A method according to claim 1, comprising a step of assigning a total transmission resource to each of said cells.

24. A method according to claim 23, wherein said assigning step takes account of at least one of the constraints belonging to the group including the probability of waiting for an available channel and the probability of the blocking of said resource.

25. A method according to claim 1, wherein at least one of said steps is performed at least twice.

26. A method according to claim 1, wherein said step for estimating a radio-electric cover is preceded by a step for the determining a model of propagation, taking account of radio-electric field values estimated by computation.

27. A method according to claim 1, comprising a step of dividing up of the total transmission resource assigned to each of said cells into signalling channels and traffic channels.

28. A method according to claim 27, wherein said dividing step takes account of at least one of the constraints belonging to the group including the probability of waiting for an available channel and the probability of the blocking of said resource.

29. A method according to claim 1, further comprising a step of modifying a characteristic of the base station selected from the group comprising the geographical location and technical characteristics of said base station as a function of said real geographical cover zone, and repeating at least one time said steps of estimating a radio-electric cover, determining a real geographical cover zone and affecting transmission resources to said cell.

* * * * *

UNITED STATES PATENT AND TRADEMARK OFFICE
CERTIFICATE OF CORRECTION

PATENT NO. : 5,465,390
DATED : November 7, 1995
INVENTOR(S) : ROBERT COHEN

It is certified that error appears in the above-indentified patent and that said Letters Patent is hereby corrected as shown below:

Title page: Under FOREIGN PATENT DOCUMENTS delete "WO-A-9010342 9/1990"

Col. 20, line 17, delete "rectilincar", insert --rectilinear--

Col. 21, line 20, delete "MH", insert --AIH--

Col. 21, line 29, delete "I=Ca", insert --I=C/I

Signed and Sealed this

Twenty-seventh Day of February, 1996

*Attest:*

BRUCE LEHMAN

*Attesting Officer*  Commissioner of Patents and Trademarks